May 10, 1932.   H. W. STEINER ET AL   1,857,168
CUSHIONING CONNECTION
Filed Oct. 27, 1928
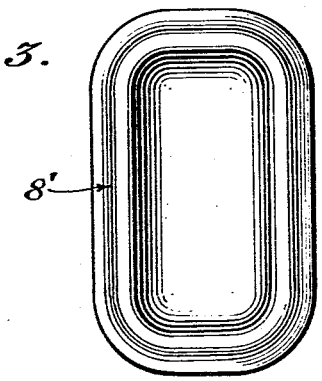
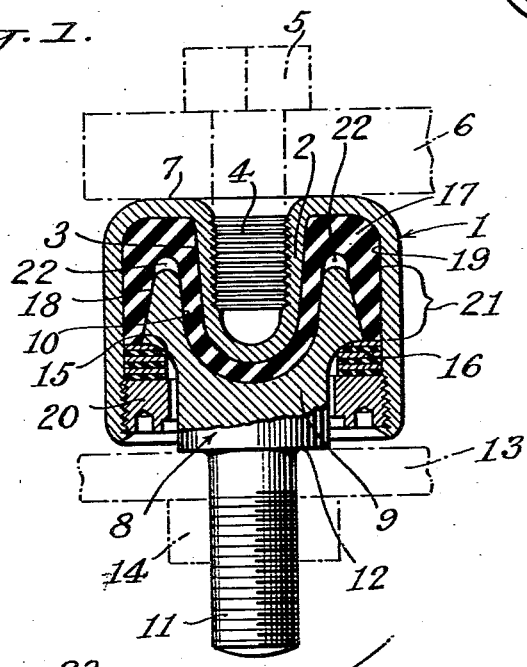
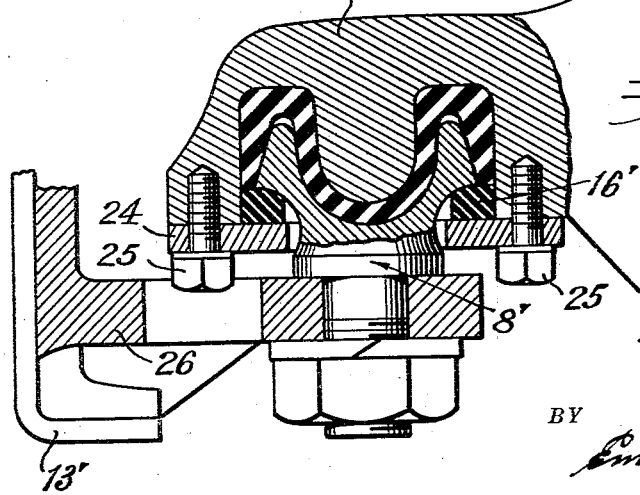
INVENTORS
Hubbard W. Steiner
Jess G. Eldridge
Walter C. Keys
BY
*Ernest Hopkinson*
ATTORNEY Patented May 10, 1932

1,857,168

UNITED STATES PATENT OFFICE

HUBBARD W. STEINER, JESS G. ELDRIDGE, AND WALTER C. KEYS, OF DETROIT, MICHIGAN, ASSIGNORS TO THE MECHANICAL RUBBER COMPANY, OF CLEVELAND, OHIO, A CORPORATION OF NEW JERSEY

CUSHIONING CONNECTION

Application filed October 27, 1928. Serial No. 315,421.

This invention relates to non-metallic connections, more particularly to cushion connections such as used for mounting an automobile engine on a chassis frame.

One object of the invention is to provide a device of the above noted character embodying simplicity, ruggedness and low manufacturing cost.

Other objects are to provide a connection adapted to maintain lateral stability between the engine and the frame, to absorb high frequency vibrations of small amplitude, to provide a connection having relatively large areas in surface contact with the engine and the frame respectively, and to further provide a connection in which the combination of vertical flexibility and lateral stability may be varied to obtain the desired cushioning characteristics.

Further features and advantages will appear upon a consideration of the following specification and the accompanying drawings, in which Fig. 1 is a vertical section of one embodiment of the invention;

Fig. 2 is a slightly modified form; and

Fig. 3 is a plan view of a further alternative form of one part of the invention.

In the drawings, the reference numeral 1 indicates a metallic member in the form of a housing which is preferably stamped from sheet metal and formed with a male portion 2 which extends within the housing 1. The male portion may be tapered, as indicated at 3, or made without taper, and also has a threaded bore 4 for a cap screw 5 adapted to hold the housing 1 securely to the arm 6 of a motor. The housing 1 is preferably formed with a broad, flat surface 7 engaging the arm 6 so as to have a large area of metal parts in contact and thereby secure a more solid connection of the housing 1 to the arm 6. A second member designated 8 includes a head portion 9 having a cavity 10 which is adapted to interfit the male member 2. The head 9 is also provided with a threaded stem 11 which forms with the head 9, a broad shoulder 12 adapted to be clamped against the chassis frame 13 of an automobile by means of a nut 14 on the threaded stem 11. The broad shoulder 12 provides a large area of metal-to-metal contact and secures a more solid connection between the member 8 and the frame 13, as will be readily understood. The member 8 is also provided with a shoulder 15 which is disposed within the housing 1 and against which there is fitted a non-metallic washer 16 which may be of any suitable non-rigid construction, as for instance, alternate layers of duck and rubber or semi-hard rubber only, either of which possesses satisfactory insulating and cushioning qualities.

Suitable cushioning material such as rubber composition 17 within the housing 1 interposes the cavity 10 and the male member 2 and extends around the mouth of the cavity and thence down around the side wall 18 of the member 8 so as to interpose a cushion between the wall 18 and the interior wall 19 of the housing 1. This rubber composition is preferably held under precompression through the medium of the washer 16 which is backed by a retaining ring 20 which may be welded to the housing 1 but is preferably threaded into the open end of the housing 1. In some cases the ring 20 may be dispensed with and the lower edge of the housing turned inwardly beneath the washer 16 to hold it against the shoulder 15. This may be done also to prevent unscrewing of the ring 20.

According to this construction, vertical vibration is cushioned through the medium of the rubber interposed between the cavity 10 and the male member 2, and lateral stability is effected by reason of the interposed rubber between the side wall 18 of the member 8 and the interior wall 19 of the housing 1, also the rubber between the cavity 10 and the male portion 2. Oil and air, etc., is excluded by reason of the fact that the rubber 18 is completely encased. It is the preferred practice to incline the wall 18 with respect to the wall 19 so that the rubber interposed therebetween will be wedge shaped in cross section and will therefore be compressed during vertical vibration of the housing member 1 with respect to the member 8. Such inclination of the wall 18 further facilitates assemblage of the parts. It will be seen that the cushioning characteristics may be varied by the amount of pressure exerted by the washer 16 against the shoulder 15 and it is possible to arrange lateral stability an amount equivalent to vertical compression by varying the shape of the space between the wall 18 and the wall 19 in combination with variation in precompression of the rubber washer 16. It may be also found advantageous to have the rubber between the walls 18 and 19, that is, the portions embraced by the bracket 21, of different compression characteristics (harder stock for instance) than the other rubber contained within the housing so as to obtain proper sidewise stability in combination with the desired vertical cushioning. The rubber 17 may have a circumferential void, as indicated at 22, adjacent the mouth of the recess 10 to permit flow of the rubber 17 under load, and it is evident the size, shape, location and number of the voids may be varied to suit particular conditions. It will be noted the rubber 17 is fully protected from air and oil.

Referring to Fig. 2 it will be observed that the housing 1 may be formed integral with and in an engine arm 23 properly shaped to cooperate with the member 8′ substantially as described in the embodiment shown in Fig. 1, and that instead of the retaining or rebound ring 20, there may be provided a washer plate 24 secured to the arm 23 as by bolts 25, whereby to maintain the rebound washer 16′ and members 8′ and 23 in cooperative working relation. Member 8′ is disclosed in Fig. 2 as fastened to a bracket 26 which is in turn secured in any suitable way to the frame 13′ of the car, although it is to be understood that the member 8′ may be an integral part of the bracket 26 or of the frame 13′, or associated with the frame in any other satisfactory manner.

Fig. 3 represents a plan view of one form of cavity member 8′, substantially oblong in plan view (instead of circular), the advantage being that a relatively large amount of cushioning material can be used where it is most needed. That is, lengthwise of the chassis frame 13′, whereby to more effectively take care of lateral tremor, and provide a large supporting area of rubber in a narrow space. Also, the form shown in Fig. 3 may be used in the Fig. 1 construction as will be readily understood, or both of the described examples may have round or otherwise suitably shaped male and female portions.

With the foregoing description, it is evident that various alterations and modifications may suggest themselves to those skilled in the art without departing from the spirit of the invention, and it is therefore not intended to limit the invention except as defined in the appended claims.

Having thus described our invention, what we claim and desire to protect by Letters Patent is:

1. A cushion connection comprising a metallic member in the form of a housing having a male portion forming a part thereof and disposed within said housing, a second metallic member extending within said housing and provided with a cavity interfitting said male portion, non-metallic cushioning material in said housing between said members, and means for maintaining said members and said cushioning material in cooperative relation, said cushioning material being completely enclosed by said means and the housing.

2. A cushion connection comprising a metallic member in the form of a housing having a male portion forming a part thereof and completely enclosed by said housing, a second metallic member extending within said housing and provided with a cavity the walls of which surround said male portion, vulcanized rubber composition in said housing between said members, and means for confining said composition in cooperative working relation between said members.

3. A cushion connection comprising a metallic member in the form of a housing having a male portion forming a part thereof and completely enclosed by said housing, a second member having a portion thereof extending within said housing, said portion being provided with a cavity the walls of which surround said male portion, said second member having an outside wall portion inclined with respect to the inner wall of the housing, vulcanized rubber composition in said housing between said members, and means for maintaining said members and said rubber composition in cooperative working relation.

4. A cushion connection comprising a metallic member in the form of a housing having a male portion disposed within said housing, a second metallic member having a portion extending within said housing and provided with a cavity interfitting said male portion, said second member also including a shoulder and being tapered on the outside between said shoulder and the mouth of said cavity, vulcanized rubber composition in said housing between said members, and means including a non-metallic washer fitting against said shoulder and holding said members together on said rubber composition.

5. A cushion connection comprising a metallic member in the form of a housing having a male portion disposed within said housing, a second metallic member including a head extending within said housing, said head being provided with a recess interfitting said male portion, said recess and the male portion being correspondingly tapered, said head including an outer wall portion converging toward said cavity and having a shoulder beneath said converging wall, rubber composition interposed between said recess and the male member and also between said converging wall and the inner wall of said housing, a non-metallic washer engaging said shoulder, and means carried by said housing for holding said washer against said shoulder, whereby to maintain said members in cooperative relation on said rubber composition.

6. A cushion connection comprising a metallic member in the form of a housing having a male portion disposed within said housing, a second metallic member in the form of a head having a threaded stem at one end and a cavity at the other end, the male member being arranged to interfit said cavity, said head also including an annular shoulder and having its outer walls which extend toward said cavity inclined with respect to the inner wall of the housing, rubber composition interposed between said members in said housing, a non-metallic washer fitted against said shoulder, and a retaining ring secured in said housing in a manner to hold said washer against the shoulder, and thereby maintain both of said members in cooperative relation upon said rubber composition.

7. A cushion connection comprising a metallic member in the form of a housing having a male portion disposed within said housing, a second metallic member including a portion extending within said housing and provided with a cavity adapted to interfit said male portion, said second member also including inclined side walls adjacent the interior wall of said housing, rubber composition interposed in said housing between the male member and the cavity, and rubber composition having different characteristics than said first named composition interposed between the inclined wall and said inner wall of the housing, and means for maintaining said members and said composition in cooperative working relation.

8. A cushion connection comprising a metallic member in the form of a housing having a male portion disposed within said housing, a second metallic member including a cavity interfitting said male portion, rubber composition interposed between said members in said housing, and means for confining said composition to working position between said members, said composition being of less volume than the space within which it is confined.

9. A cushion connection comprising a metallic member in the form of a housing having a male portion disposed within said housing, said male portion having a threaded bore, a second metallic member having a cavity adapted to interfit said male portion, said second member also having a shoulder portion disposed within the housing and being characterized by inclined side walls extending from said shoulder to the mouth of said cavity, vulcanized rubber composition in said housing interposed between said members, a non-metallic washer, and a retaining ring secured in the open end of said housing adapted to hold said washer against the shoulder, said washer being arranged to confine said composition to working position between the members and to maintain said members and said composition in cooperative relation.

10. A cushion connection including metallic inter-fitting male and female members, non-metallic cushioning material interposed between said members, one of said members having a shoulder, and means including a non-metallic washer cooperating with said shoulder to confine said cushioning material in working position between said members and maintaining the latter and said cushioning material in cooperative working relation.

11. A cushion connection comprising in combination, a pair of metallic members provided respectively with cavities and projections of approximately similar contour normally spaced apart to define a cavity, yielding material nearly completely filling said cavity, means fixed to one of said members and connected non-metallically with the other member for substantially completely closing the cavity therebetween, and additional yielding material intermediate said last named means and the first mentioned yielding material.

12. A cushion connection comprising in combination, a pair of metallic members provided respectively with cavities and projections of approximately similar contour normally spaced apart to define a cavity, yielding material nearly completely filling said cavity, means fixed to one of said members and connected non-metallically with the other member for substantially completely closing the cavity therebetween, and additional yielding material intermediate said last named means and the first mentioned yielding material, the first mentioned yielding material being adapted to resist and/or absorb vibrations parallel as well as transverse to the normal direction of the load carried by said cushioning connection.

13. A cushion connection comprising in combination a pair of metallic members provided respectively with cavities and projections of approximately similar contour normally spaced apart to define a cavity, yielding material nearly completely filling said cavity, means fixed to one of said members and connected non-metallically with the other member for substantially completely closing the cavity therebetween, and additional yielding material intermediate said last named means and the first mentioned yielding material, there being no metallic connection between the pair of members within the region thereof contacted by the first mentioned yielding material.

Signed at Detroit, county of Wayne, State of Michigan, this 6th day of October, 1928.

HUBBARD W. STEINER.
JESS G. ELDRIDGE.
WALTER C. KEYS.